Sept. 25, 1923.
M. KING
1,469,016
COMBINED CAMERA AND PROJECTOR MECHANISM FOR MOVING PICTURE FILMS
Filed Aug. 22, 1919
3 Sheets-Sheet 1
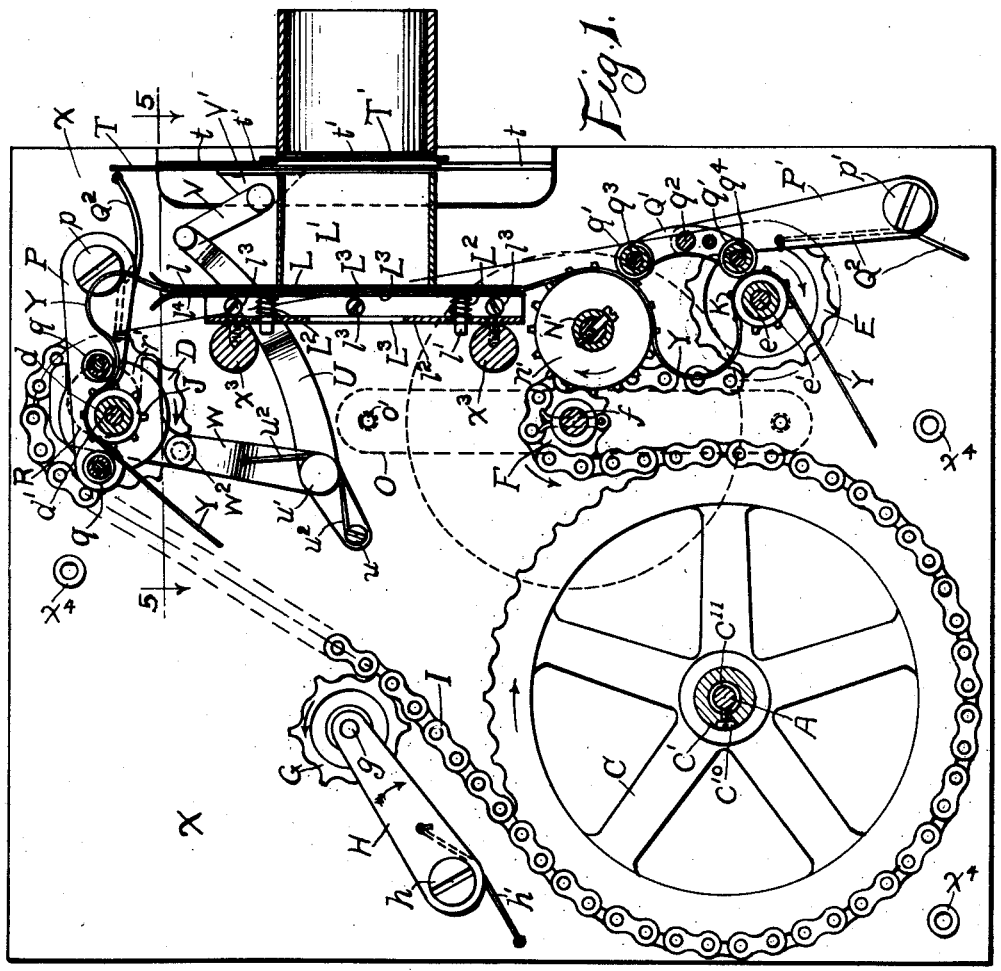
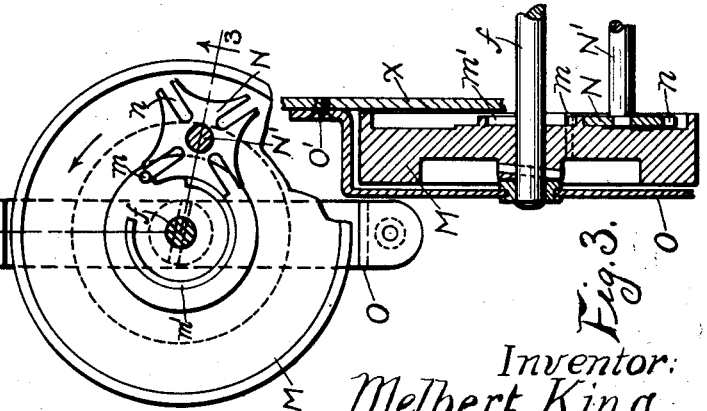
Witness:
E.D. Jacker
Inventor:
Melbert King,
By Charles Turner Brown.
Atty.

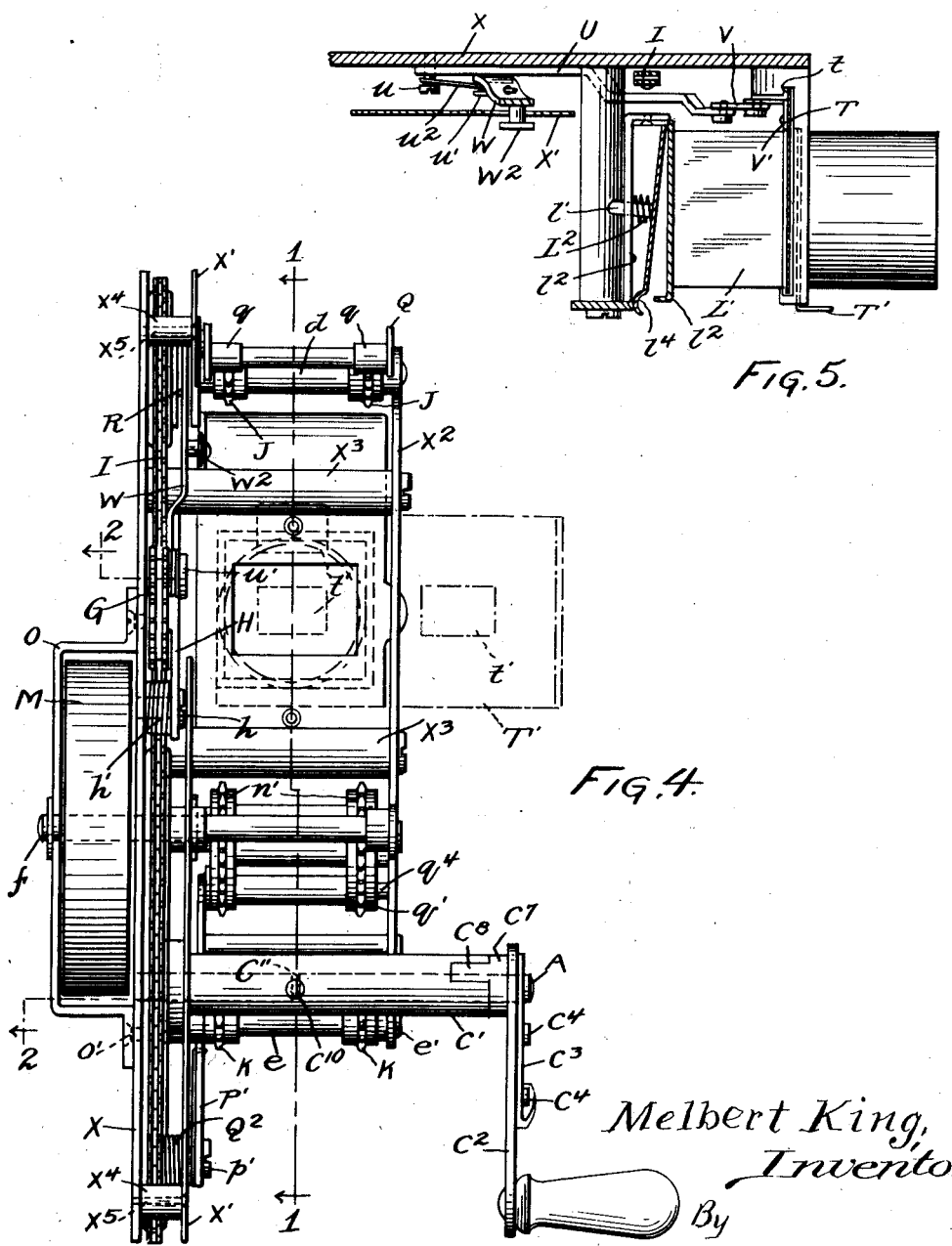

Sept. 25, 1923. 1,469,016
M. KING
COMBINED CAMERA AND PROJECTOR MECHANISM FOR MOVING PICTURE FILMS
Filed Aug. 22, 1919 3 Sheets-Sheet 3
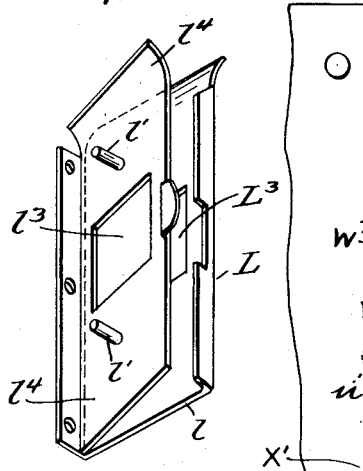
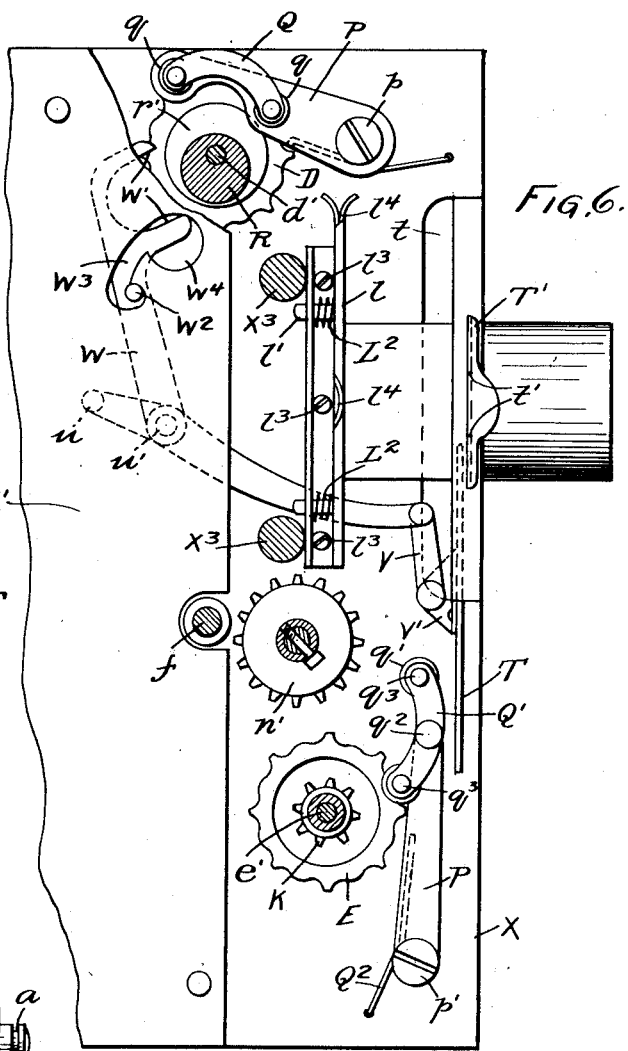
Melbert King,
Inventor:
By Charles Turner Brown,
Atty.

Patented Sept. 25, 1923.

1,469,016

UNITED STATES PATENT OFFICE.

MELBERT KING, OF CHICAGO, ILLINOIS, ASSIGNOR OF ONE-THIRD TO CHARLES TURNER BROWN, OF CHICAGO, ILLINOIS.

COMBINED CAMERA AND PROJECTOR MECHANISM FOR MOVING-PICTURE FILMS.

Application filed August 22, 1919. Serial No. 319,140.

*To all whom it may concern:*

Be it known that I, MELBERT KING, a citizen of the United States, and a resident of Chicago, in the county of Cook and State of Illinois, have invented certain new and useful Improvements in Combined Camera and Projector Mechanism for Moving-Picture Films, of which the following is a specification.
This invention relates to mechanism, by means of which when it is enclosed and properly positioned in a dark box having suitable lenses properly p'aced and focused, a moving picture film may be exposed for the taking of views thereon in the manner usual in moving picture cameras, and also, when a moving picture film is placed in said mechanism enclosed as aforesaid in a dark box, and said box is provided with suitable lenses, said film may be projected in the usual manner of projecting moving picture films.

Among the objects of this invention are, to obtain a combined camera and projector mechanism for moving picture films which is simple in construction, comprising few elements, not liable to be injured or to get out of order; a mechanism which is certain in its operation, and in which a moving picture film may be easily and quickly inserted and readily removed; and a mechanism which, when operated, is not liable to injure, break or tear a film; a mechanism which is easily understood and operated by persons not particularly ski'led in the art; and a mechanism which may be readily converted from being operable as a camera to one operable as a projector, and vice versa.

A construction embodying this invention is illustrated in the drawing acccompanying and forming a part hereof, in which Fig. 1 is a vertical section on line 1—1 of Fig. 4, viewed in the direction indicated by the arrows, with the several parts positioned to be used as a camera, and with a plate (which is illustrated in Fig. 4), removed, to expose to view operating parts thereunder.

Fig. 2 is an elevation of a Geneva lock movement, on line 2—2 of Fig. 4, viewed in the direction indicated by the arrows.

Fig. 3 is a vertical section on line 3—3 of Fig. 2, viewed in the direction indicated by the arrows.
Fig. 4 is a rear end elevation.

Fig. 5 is a horizontal section, on line 5—5 of Fig. 1, viewed in the direction indicated by the arrows.

Fig. 6 is a similar section as is Fig. 1, viewed in the same direction, showing so many of the parts as are illustrated in Fig. 1 as are necessary to indicate the position thereof when the mechanism is used as a projector, and positioned to insert a film.

Fig. 7 is a detail, showing a portion of the hand'e of the mechanism in top plan view.

Fig. 8 is an end elevation of the handle which is illustrated in Fig. 7.

Fig. 9 is an elevation of the spindle and rotatable sleeve on which said handle is mounted.

Fig. 10 is a perspective of the film guide of the mechanism; and

Fig. 11 is a plan view of a portion of the camera shutter.

A reference character applied to designate a given part indicates said part throughout the several figures of the drawing, wherever the same appears.

X represents a base on which the mechanism is mounted; and which is adapted to be secured to one side of a dark box: $X^1$ a plate forming a sub-base which is secured to base X, in spaced relation thereto, by means of posts $X^4$ and screws $X^5$: and $X^2$ an additional sub base which is also in spaced relation to base X, being mounted on posts or standards $X^3$, $X^3$.

A represents a spindle which is rigidly secured, at the end thereof, to base X. Spindle A serves as an axle on which the sprocket wheel C and its hub, (sleeve $C^1$), rotates. The free end of spindle A is represented as provided with the annular groove *a* and the removable handle $C^2$. by means of which the mechanism is manually operable. Said handle is represented as provided with a longitudinally movable latch, $C^3$, which is engageable with said groove *a*, to retain said handle in position, on the end of s'eeve $C^1$. The handle $C^2$ is represented as provided with studs $C^4$, (Fig. 7), and the latch $C^3$ is represented as having slots $C^5$, $C^5$, through which said studs extend, permitting said longitudinal movement of the latch. Latch $C^3$ is also represented as provided with the keyhole slot $C^6$; the portion thereof of larger diameter fitting over the end of spindle A, and the portion of smaller diameter fitting the annular groove $a$. Handle $C^2$ is also provided with a hub, $C^7$, having lugs or projections $C^8$, $C^8$, which fit into the recesses $C^9$, $C^9$, (Fig. 9), in the end of sleeve $C^1$.

Handle $C^2$ being secured on the end of sleeve $C^1$, as illustrated in Fig. 4, as last above described, rotation of said handle correspondingly rotates sleeve $C^1$ and sprocket wheel C. Sleeve $C^1$ is prevented from moving longitudinally on spindle A by set screw $C^{10}$, fitting, at its inner end, in groove $C^{11}$, (Fig. 4).

D, and E, respectively represent sprocket wheels which are rigidly secured on sleeves $d$ and $e$; and said sleeves are rotatably mounted on spindles $d^1$, $e^1$. F represents a sprocket wheel which is mounted on shaft $f$, and said shaft is rotatably mounted in sub base $X^2$ and bracket O, (hereinafter described). G represents an idler sprocket wheel which is rotatably mounted on axle $g$. Axle $g$ is rigidly secured in arm H, and said arm is pivotally mounted on post $h$. $h^1$ represents a spring which yieldingly forces arm H in the direction indicated by the arrows on said arm in Fig. 1, thus forcing idler G against the sprocket chain I. Sprocket chain I extends over the sprocket wheels C, D, E, and F; and when said sprocket wheel C is turned to the right, by means of handle $C^2$, as indicated by the arrow, (Fig. 1), thereon, the sprockets D, E, F and G are respectively rotated in the direction indicated by the arrows thereon; and continuous rotation of said handle produces continuous rotation of said sprocket wheels, and of the sleeves $d$ and $e$.

J and K, respectively represent wheels which are secured on sleeves $d$ and $e$, to rotate therewith, and said wheels are provided with teeth which are adapted to engage with the apertures common to moving picture films; and as said wheels continuously rotate said films are continuously moved, being engaged therewith.

To obtain the required step by step movement of the films through the guide L, hereinafter specifically described, the wheel M (see Fig. 2), is rigidly secured on shaft $f$; said wheel having post $m$, thereon, an annular flange $m^1$, (said flange being broken opposite said post), and said post being positioned to engage with recesses $n$ of wheel N, said wheel is rotated by a step by step movement. Wheel N is rigidly mounted on rotatable shaft $N^1$, as are also wheels $n^1$, $n^1$. The wheels $n^1$, $n^1$ are provided with teeth adapted to engage with the apertures in moving picture films, in the same manner as $d^1$ and $e^1$. The step by step movement of said wheels $n^1$, $n^1$, imparts a step by step (or intermittent) movement to the film, (indicated by the reference letter Y in Fig. 1), which is placed in the machine, to extend over the several wheels $d^1$, $e^1$ and $n^1$, giving intervals of movement and rest to said film, as is required in moving picture cameras and projectors.

Examination of wheel M, Fig. 3, discloses that said wheel is made with considerable body, or mass, thereto, tending to give uniformity to the rotation thereof, notwithstanding the step by step movement imparted thereby to wheel N, shaft $N^1$ and wheels $n^1$, $n^1$, on said shaft. Wheel M acts, therefore as a balance wheel in the above recited operation. Cross bar O, which is secured to the plate X, by screws $O^1$, $O^1$, is provided with journal bearing for one end of shaft $f$, the other end of said shaft being in plate or sub base $X^1$, as hereinbefore stated.

To ensure constant engagement of film Y with the toothed wheels, J, $n^1$, and K, respectively, and at the same time permit a film to be readily placed thereon, with the teeth of said wheels in corresponding apertures adjacent to the edges of said film, the arms P, $P^1$, are pivotally mounted on plate or base X, by means of pivots $p$, $p^1$; said arms being provided with frames Q, and $Q^1$, having rollers $q$, $q^1$, rotatably mounted thereon, and means (springs $Q^2$, $Q^2$), to yieldingly hold said arms in position, with said rollers against said film Y, when said film is in operable condition.

The free end of arms P, $P^1$, carrying frames Q, $Q^1$, respectively, may be forced back against the resiliency of springs $Q^2$, $Q^2$, when a film is to be placed on the several wheels J, K and $n^1$.

It will be observed that the frame $Q^1$ is pivotally mounted, as by pivot $q^2$, on arm $P^1$, and that, as is illustrated in Fig. 1, one of the rollers $q^1$ which is rotatably mounted on rod $q^3$, (said rod forming an element of said frame) is yieldingly held against the film on wheel $n^1$, and the other of said rollers $q^1$, in said frame $Q^1$, being mounted on rod $q^4$ is yieldingly held against the film on wheel K.

In Fig. 6 the roller $q^1$, which as last above recited, is yieldingly held against the film Y on toothed wheel $n^1$, is illustrated as retracted against the resiliency of spring $Q^2$, it being in the position to permit a film to be placed on said toothed wheel $n^1$.

The guide L hereinbefore referred to is illustrated in perspective in Fig. 10. Said guide comprises base $l$, which is rigidly secured to light tube $L^1$, and is provided with posts $l^1$, $l^1$, and sub-base $l^2$. Sub-base $l^2$ is rigidly secured to base $l$, as by screws $l^3$. $l^4$ represents a movable member which is mounted on posts $l^1$, $l^1$, said posts extending through apertures provided therefor in said member. It also comprises springs $L^2$, $L^2$, which are mounted on posts $l^1$, $l^1$, so that one end thereof thrusts against sub base $l^2$, and the other end against $l^4$, to yieldingly force and hold said member $l^4$ into a predetermined spaced relation with base $l$, as is illustrated in Fig. 1; with the film Y interposed between said member $l^4$ and said base $l$. The base $l$ and member $l^4$ and sub base $l^2$, are, respectively, provided with apertures which are designated by character $L^3$, in Figs. 1 and 10.

Sleeve $d$, hereinbefore described as rotatably mounted on spindle $d^1$ and attached to toothed wheel J, by means of which the film Y is fed to guide L, is rigidly attached to disc $r$, said disc being rigidly attached to cam R, said cam to disc $r^1$, and said disc to wheel D. Said sleeve $d$, disc $r$, cam R, disc $r^1$ and wheel D are illustrated as soldered or brazed together, to form an integral member which is rotatable on shaft or axle $d^1$, said cam R being shown in section in Fig. 6 and said cam $r^1$ and sprocket wheel D in elevation.

By means of said cam R and mechanism about to be described, the movement of the shutter T, also about to be described, is obtained in timed relation to the step by step movement of the film Y hereinbefore recited. Shutter T is movable longitudinally in guide $t$. Guide $t$ is rigidly attached to one end of light tube $L^1$, (see Figs. 5 and 6), and is provided with aperture $t^1$. $T^1$ represents a plate which is provided with a light aperture similar to aperture $t^1$ in movable shutter T, and positioned so that the movement of shutter T in guide $t$, causes said apertures to register when film Y is at rest, (stationary). The body part of said movable shutter T closes said aperture in said plate $T^1$ when the film Y is moving.

The timed longitudinal movement of movable shutter T is obtained by means of lever U, which is connected to said shutter by link V, connected to abutment $V^1$. Lever U is pivotally mounted on fulcrum $u$, which is secured in base X, and cam connection W is pivotally connected to lever U, by pin $u^1$. Cam connection W is provided with fork $W^1$, which is engageable with cam R, (see Figs. 6 and 1). Said fork $W^1$ being in engagement with cam R, (as in Fig. 1), said cam connection W is moved substantially longitudinally by said cam, giving an angular movement to lever U on its fulcrum $u$, and by means of link V said movement of said lever is transmitted to shutter T, producing the longitudinal movement thereof described.

The cam engaging fork $W^1$ being in engagement, as last above described, with cam R, the hereinbefore described mechanism is operable as a camera mechanism for moving picture films. Maintenance of said cam engaging fork with said cam is yieldingly maintained by means of spring $u^2$, (Fig. 1).

To convert said mechanism into operable condition for use as a projector for moving picture films, it is simply necessary to disengage said cam engaging fork $W^1$ from said cam R, and member W is provided with handle $W^2$ movable in curved slot $W^3$ in plate or sub base $X^1$; to permit said disengagement. When handle $W^2$ is in the circular aperture $W^4$ (which communicates with slot $W^3$), cam connection W is in substantially the position in which it is illustrated in Fig. 1 (plate $X^1$ being removed in said Fig. 1, to expose the parts thereunder to view), and when in said slot $W^3$, as illustrated in Fig. 6, said cam connection is disengaged from cam R.

It is to be observed that sprocket wheel D continuously feeds film Y to guide L, and sprocket wheel E continuously discharges said film; and that toothed wheel $n^1$ draws said film through said guide by a step by step movement; and hence during the time said toothed wheel and film are stationary a loop is made by said film between toothed wheels J and guide L, and between toothed wheels $n^1$ and K.

To operate the mechanism as camera mechanism the cam connection W is placed in position with cam fork $W^1$ in engagement with cam R; a film is placed in the mechanism as illustrated in Fig. 1, and crank $C^2$ is turned in the direction indicated by the arrow on sprocket wheel C, Fig. 1.

To operate as a projector mechanism the cam fork $W^1$ is dis-engaged from cam R, and said handle is operated in the same direction and manner as when used as a camera mechanism, shutter T at said time being below the light aperture in plate $T^1$, as in Fig. 6, and the ordinary projector shutter being provided and arranged to rotate in timed relation to said mechanism; but said projector shutter and the means to attach and actuate it form no part of this invention.

I claim:—

1. A moving picture camera, comprising a film chute, means for moving film through said chute. comprising a film sprocket, a cam secured to said film sprocket, means for driving said sprocket and cam, a lens tube support, a shutter guide between said lens tube support and said film chute, a shutter mounted to reciprocate in said guide, a lever for reciprocating said shutter, and means connected with said lever and detachably connected with said cam for oscillating said lever.

2. Chain driven mechanism including a cam, a fulcrumed lever, a cam connection attached to said lever and removably engageable with said cam, in combination with a shutter provided with a light aperture and a link connecting said lever and said shutter, and a stationary plate provided with a light aperture.

3. A longitudinally movable shutter provided with a light aperture and a stationary plate also provided with a light aperture, in spaced relation to said movable shutter, a fulcrum lever and a link connecting said lever and said movable shutter, in combination with a rotatably mounted cam and a cam connection, said connection attached to said lever and engageable with said cam, means to yieldingly hold said connection and cam engaged, means to intermittently move a moving picture film, and to actuate said cam and said intermittently moving means in timed relation.

4. A longitudinally movable shutter provided with a light aperture, a stationary plate provided with a light aperture, said shutter and plate in spaced relation, a fulcrumed lever, and a link connecting said lever and said movable shutter, in combination with a rotatably mounted cam, a connection between said lever and said cam, means to hold said connection in yielding engagement with said cam and means to hold said connection disengaged from said cam, means to actuate said cam and to move a moving picture film intermittently in timed relation to the movement of said cam and shutter moved thereby.

5. A rotatably mounted sprocket wheel, removable means to manually operate said wheel, additional sprocket wheels on rotatably mounted sleeves to turn therewith, wheels on said sleeves and a cam on one of said sleeves, a rotatably mounted shaft and wheels thereon, all said wheels provided with teeth adapted to engage with the apertures in a movable picture film, yielding means to hold said film in engagement with said teeth, an additional rotatably mounted shaft and a sprocket wheel thereon, a Geneva lock movement between said shafts arranged to move the first named shaft intermittently, a sprocket chain in engagement with all said sprocket wheels, and means to hold said sprocket chain taut, a shutter provided with a light aperture, and a removable connection between said cam and said shutter; all combined as set forth.

6. A rotatably mounted chain sprocket wheel, removable means to manually operate said wheel, additional chain sprocket wheels and film sprockets thereto arranged to turn in unison and a cam arranged to turn with one of said chain and film sprockets, a rotatably mounted shaft and film sprockets thereon to turn therewith, yielding means to hold a moving picture film in engagement with said film sprockets, an additional rotatably mounted shaft and a chain sprocket wheel thereon, a Geneva lock movement between said shafts arranged to move the first named shaft intermittently, a sprocket chain in engagement with all said chain sprocket wheels and means to hold said chain taut, in combination with a shutter provided with a light aperture, and a removable connection between said cam and said shutter.

MELBERT KING.

Witnesses:
CHARLES TURNER BROWN,
RAE LAKE.